United States Patent
Bolton

(10) Patent No.: US 7,439,711 B2
(45) Date of Patent: Oct. 21, 2008

(54) ENERGY STORAGE DEVICE INCLUDING A STATUS INDICATOR

(75) Inventor: Michael J. Bolton, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 340 days.

(21) Appl. No.: 10/951,258

(22) Filed: Sep. 27, 2004

(65) Prior Publication Data

US 2006/0071645 A1   Apr. 6, 2006

(51) Int. Cl.
*H01M 10/46* (2006.01)
(52) U.S. Cl. .................... 320/166; 320/132
(58) Field of Classification Search .......... 320/107, 320/132, 149, DIG. 21, 166, 167
See application file for complete search history.

(56) References Cited

U.S. PATENT DOCUMENTS

| | | | |
|---|---|---|---|
| 1,951,089 A | 3/1934 | Fielder | |
| 3,524,069 A | 8/1970 | Stepanov et al. | |
| 3,690,559 A | 9/1972 | Rudloff | |
| 3,764,867 A | 10/1973 | Smith | |
| 3,799,284 A | 3/1974 | Hender | |
| 3,865,209 A | 2/1975 | Aihara et al. | |
| 3,966,067 A | 6/1976 | Reese | |
| 4,088,934 A | 5/1978 | D'Atre et al. | |
| 4,097,925 A | 6/1978 | Butler, Jr. | |
| 4,113,045 A | 9/1978 | Downing, Jr. | |
| 4,292,531 A | 9/1981 | Williamson | |
| 4,319,140 A | 3/1982 | Paschke | |
| 4,336,418 A | 6/1982 | Hoag | |
| 4,423,362 A | 12/1983 | Konrad et al. | |
| 4,423,794 A | 1/1984 | Beck | |
| 4,461,988 A | 7/1984 | Plunkett | |
| 4,533,011 A | 8/1985 | Heidemeyer et al. | |
| 4,562,894 A | 1/1986 | Yang | |
| 4,719,361 A | 1/1988 | Brubaker | |
| 4,774,399 A | 9/1988 | Fujita et al. | |
| 4,774,811 A | 10/1988 | Kawamura | |
| 4,953,646 A | 9/1990 | Kim | |

(Continued)

FOREIGN PATENT DOCUMENTS

DE   18 16 183   6/1970

(Continued)

OTHER PUBLICATIONS

East Ridge Studio & Video, "Stinger SCDBM—voltage gauge/distribution block", available at http://www.theinstallationshop.com/index.asp?PageAction=VIEWPROD&ProdID=77, believed to be available prior to Sep. 27, 2004, (2 pages).

(Continued)

*Primary Examiner*—Edward Tso
(74) *Attorney, Agent, or Firm*—Foley & Lardner LLP

(57) ABSTRACT

An energy storage device for use with an electric vehicle includes an electrical energy storage device configured to be coupled to an electrical traction system of the electric vehicle to provide electrical power to the electrical traction system. The energy storage device also includes a sensor integrally mounted within the electrical energy storage device and configured to measure a voltage of the electrical energy storage device. The sensor also includes a status indicator integrally mounted to the electrical energy storage device and configured to provide a visual indication of the voltage.

16 Claims, 5 Drawing Sheets

U.S. PATENT DOCUMENTS

| | | |
|---|---|---|
| 4,966,242 A | 10/1990 | Baillargeon |
| 4,985,845 A | 1/1991 | Goetz et al. |
| 5,067,932 A | 11/1991 | Edwards |
| 5,081,832 A | 1/1992 | Mowill |
| 5,120,282 A | 6/1992 | Fjaellstroem |
| 5,168,946 A | 12/1992 | Dorgan |
| 5,180,456 A | 1/1993 | Schultz et al. |
| 5,195,600 A | 3/1993 | Dorgan |
| 5,201,629 A | 4/1993 | Simpson et al. |
| 5,202,830 A | 4/1993 | Tsurumiya et al. |
| 5,227,703 A | 7/1993 | Boothe et al. |
| 5,263,524 A | 11/1993 | Boardman |
| 5,264,763 A | 11/1993 | Avitan |
| 5,289,093 A | 2/1994 | Jobard |
| 5,291,960 A | 3/1994 | Brandenburg et al. |
| 5,343,971 A | 9/1994 | Heidelberg et al. |
| 5,345,154 A | 9/1994 | King |
| 5,349,535 A | 9/1994 | Gupta |
| 5,369,540 A | 11/1994 | Konrad et al. |
| 5,409,425 A | 4/1995 | Shibahata |
| 5,418,437 A | 5/1995 | Couture et al. |
| 5,448,561 A | 9/1995 | Kaiser et al. |
| 5,508,594 A | 4/1996 | Underwood et al. |
| 5,516,379 A | 5/1996 | Schultz |
| 5,538,274 A | 7/1996 | Schmitz et al. |
| 5,558,588 A | 9/1996 | Schmidt |
| 5,558,589 A | 9/1996 | Schmidt |
| 5,558,595 A | 9/1996 | Schmidt et al. |
| 5,568,023 A | 10/1996 | Grayer et al. |
| 5,575,730 A | 11/1996 | Edwards et al. |
| 5,575,737 A | 11/1996 | Weiss |
| 5,586,613 A | 12/1996 | Ehsani |
| 5,589,743 A | 12/1996 | King |
| 5,623,194 A | 4/1997 | Boll et al. |
| 5,629,567 A | 5/1997 | Kumar |
| 5,629,603 A | 5/1997 | Kinoshita |
| 5,646,510 A | 7/1997 | Kumar |
| 5,659,240 A | 8/1997 | King |
| 5,669,470 A | 9/1997 | Ross |
| 5,672,920 A | 9/1997 | Donegan et al. |
| 5,679,085 A | 10/1997 | Fredriksen et al. |
| 5,767,584 A | 6/1998 | Gore et al. |
| 5,813,487 A | 9/1998 | Lee et al. |
| 5,813,488 A | 9/1998 | Weiss |
| 5,818,126 A | 10/1998 | Mohan |
| 5,820,150 A | 10/1998 | Archer et al. |
| 5,828,554 A | 10/1998 | Donegan et al. |
| 5,844,473 A | 12/1998 | Kaman |
| 5,847,520 A | 12/1998 | Theurillat et al. |
| 5,879,265 A | 3/1999 | Bek |
| 5,880,570 A | 3/1999 | Tamaki et al. |
| 5,881,559 A | 3/1999 | Kawamura |
| 5,895,440 A * | 4/1999 | Proctor et al. ............... 320/152 |
| 5,924,879 A | 7/1999 | Kameyama |
| 5,925,993 A | 7/1999 | Lansberry |
| 5,939,794 A | 8/1999 | Sakai et al. |
| 5,947,855 A | 9/1999 | Weiss |
| 5,973,463 A | 10/1999 | Okuda et al. |
| 5,986,416 A | 11/1999 | Dubois |
| 5,998,880 A | 12/1999 | Kumar |
| 6,005,358 A | 12/1999 | Radev |
| 6,028,403 A | 2/2000 | Fukatsu |
| 6,033,041 A | 3/2000 | Koga et al. |
| 6,054,844 A | 4/2000 | Frank |
| 6,104,148 A | 8/2000 | Kumar et al. |
| 6,105,984 A | 8/2000 | Schmitz et al. |
| 6,141,610 A | 10/2000 | Rothert et al. |
| 6,298,932 B1 | 10/2001 | Bowman et al. |
| 6,387,007 B1 | 5/2002 | Fini, Jr. |
| 6,421,593 B1 | 7/2002 | Kempen et al. |
| 6,429,625 B1 | 8/2002 | LeFevre et al. |
| 6,466,258 B1 | 10/2002 | Mogenis et al. |
| 6,542,077 B2 | 4/2003 | Joao |
| 6,553,290 B1 | 4/2003 | Pillar |
| 6,611,116 B2 | 8/2003 | Bachman et al. |
| 6,653,817 B2 | 11/2003 | Tate, Jr. et al. |
| 6,722,458 B2 | 4/2004 | Hofbauer |
| 6,745,117 B1 | 6/2004 | Thacher et al. |
| 6,757,597 B2 | 6/2004 | Yakes et al. |
| 6,882,917 B2 | 4/2005 | Pillar et al. |
| 6,885,920 B2 | 4/2005 | Yakes et al. |
| 6,917,288 B2 | 7/2005 | Kimmel et al. |
| 6,922,615 B2 | 7/2005 | Pillar et al. |
| 6,993,421 B2 | 1/2006 | Pillar et al. |
| 2002/0005304 A1 | 1/2002 | Bachman et al. |
| 2002/0045507 A1 | 4/2002 | Bowen |
| 2002/0065594 A1 | 5/2002 | Squires et al. |
| 2003/0130765 A1 | 7/2003 | Pillar et al. |
| 2003/0158635 A1 | 8/2003 | Pillar et al. |
| 2003/0158640 A1 | 8/2003 | Pillar et al. |
| 2003/0163228 A1 | 8/2003 | Pillar et al. |
| 2003/0163229 A1 | 8/2003 | Pillar et al. |
| 2003/0163230 A1 | 8/2003 | Pillar et al. |
| 2003/0171854 A1 | 9/2003 | Pillar et al. |
| 2003/0195680 A1 | 10/2003 | Pillar |
| 2003/0200015 A1 | 10/2003 | Pillar |
| 2003/0205422 A1 | 11/2003 | Morrow et al. |
| 2003/0230443 A1 | 12/2003 | Cramer et al. |
| 2004/0019414 A1 | 1/2004 | Pillar et al. |
| 2004/0021569 A1 | 2/2004 | Lepkofker et al. |
| 2004/0024502 A1 | 2/2004 | Squires et al. |
| 2004/0039510 A1 | 2/2004 | Archer et al. |
| 2004/0055802 A1 | 3/2004 | Pillar et al. |
| 2004/0069865 A1 | 4/2004 | Rowe et al. |
| 2004/0133319 A1 | 7/2004 | Pillar et al. |
| 2004/0133332 A1 | 7/2004 | Yakes et al. |
| 2004/0199302 A1 | 10/2004 | Pillar et al. |
| 2004/0203974 A1 | 10/2004 | Seibel |
| 2005/0004733 A1 | 1/2005 | Pillar et al. |
| 2005/0060246 A1 | 3/2005 | Lastinger et al. |
| 2005/0113988 A1 | 5/2005 | Nasr et al. |
| 2005/0113996 A1 | 5/2005 | Pillar et al. |
| 2005/0114007 A1 | 5/2005 | Pillar et al. |
| 2005/0119806 A1 | 6/2005 | Nasr et al. |
| 2005/0131600 A1 | 6/2005 | Quigley et al. |

FOREIGN PATENT DOCUMENTS

| | | |
|---|---|---|
| DE | 41 08 647 A1 | 9/1992 |
| DE | 44 31 929 C1 | 10/1995 |
| DE | 197 49 074 A1 | 5/1999 |
| DE | 101 03 922 A1 | 8/2002 |
| EP | 0 622 264 B1 | 11/1994 |
| EP | 0 805 059 B1 | 11/1997 |
| EP | 0 812 720 B1 | 12/1997 |
| EP | 0 898 213 A1 | 2/1999 |
| EP | 1 018 451 A1 | 7/2000 |
| EP | 1 092 406 A2 | 4/2001 |
| EP | 1 229 636 A3 | 8/2002 |
| FR | 2.658.259 A1 | 8/1991 |
| GB | 1 308 318 | 2/1973 |
| GB | 2 302 850 A | 2/1997 |
| JP | 60-216703 A | 10/1985 |
| WO | WO 98/19875 A1 | 5/1998 |
| WO | WO 01/54939 A2 | 8/2001 |
| WO | WO 03/055714 A1 | 7/2003 |
| WO | WO 03/093046 A2 | 11/2003 |
| WO | WO 03/093046 A3 | 11/2003 |

OTHER PUBLICATIONS

Bose, B.K. et al., "High Frequency AC vs. DC Distribution System for Next Generation Hybrid Electric Vehicle," Industrial Electronics, Control and Instrumentation, 1996, Proceedings of the 1996 IEEE IECON 22nd International Conference on Taipei, Taiwan, Aug. 5-10, 1996, New York, NY, pp. 706-712 (7 pgs.).

Khan, I.A., "Automotive Electrical Systems: Architecture and Components," Digital Avionics Systems Conference, 1999, IEEE pp. 8.C.5-1-8.C.5-10 (10 pgs.).

Namuduri, C.S. et al., "High Power Density Electric Drive for an Hybrid Vehicle," Applied Power Electronics Conference and Exposition, Feb. 15, 1998, pp. 34-40 (7 pgs.).

Rajashekara, K., "History of Electric Vehicles in General Motors," Industry Applications Society Annual Meeting, Oct. 2-8, 1993, pp. 447-454 (8 pgs.).

* cited by examiner

ENERGY STORAGE DEVICE INCLUDING A STATUS INDICATOR

FIELD

The present invention relates generally to energy storage devices used in electric vehicles and more specifically to status indicators for electrical energy storage devices used in electric vehicles.

BACKGROUND

An electric traction vehicle is a vehicle that uses electricity in some form or another to provide all or part of the propulsion of the vehicle. This electricity can come from a variety of sources, such as stored energy devices relying on chemical conversions (batteries) to create electrical energy, stored energy devices relying on stored electrical charge (capacitors), stored energy devices relying on mechanical stored energy (e.g., flywheels, pressure accumulators), and energy conversion products. In a typical conventional electric traction vehicle, a prime mover, such as a diesel engine, is used to drive an electric generator or alternator which supplies electric current to one or more traction motors. The traction motors typically are coupled to wheel sets on the vehicle. A typical vehicle that utilizes this type of electric traction is a railroad locomotive. In some conventional electric traction vehicles, stored energy is used to provide the main power which provides the electrical current to one or a plurality of traction motors. A typical vehicle that utilizes this type of electric traction is a golf cart or battery powered electric car. In some conventional electric traction vehicles, having more than one source of energy is desirable. By having more than one source of energy, some optimizations in the design can allow for more efficient power production, thus allowing power to be used from different sources to come up with a more efficient system for traction. These types of vehicles are commonly referred to as hybrid electric vehicles (HEV). Series and Parallel HEV system designs are what is usually encountered.

Electrical devices for use with electric traction vehicles, and more particularly energy storage units for use with electric traction vehicles, such as ultracapacitor storage units, may typically store large amounts of electrical energy during use on the electric traction vehicle. Similarly, electrical energy storage units that are not mounted to an electric traction vehicle may also contain large amounts of stored electrical energy. The stored electrical energy typically needs to be isolated or dissipated from the electrical energy storage unit when maintenance is to be performed on the electric traction vehicle or before the electrical energy storage unit is handled in order to avoid electrocution of maintenance personnel. The amount of stored electrical energy may be large enough to create an electrocution hazard to a person handling or working within reach of the electrical energy storage unit if that person is unaware of the presence of the stored electrical energy. Thus, it would be beneficial to provide a status indicator for use with electrical traction vehicles in order to provide an indication of the presence of electrical energy, such as electrical energy stored in an energy storage device. It would be further beneficial to provide the status indicator with the electrical energy storage device as a single integral unit.

SUMMARY

According to an exemplary embodiment, an energy storage device for use with an electric vehicle includes an electrical energy storage device configured to be coupled to an electrical traction system of the electric vehicle to provide electrical power to the electrical traction system. The energy storage device also includes a sensor integrally mounted within the electrical energy storage device and configured to measure a voltage of the electrical energy storage device. The sensor also includes a status indicator integrally mounted to the electrical energy storage device and configured to provide a visual indication of the voltage.

According to another exemplary embodiment, an electric traction vehicle includes a vehicle frame, a plurality of drive wheels rotatably coupled to the frame, a plurality of electric motors coupled to respective ones of the plurality of drive wheels, a plurality of drive controllers coupled to respective ones of the plurality of electric motors, and a power source coupled to each of the plurality of drive controllers by an electrical bus. The electric traction vehicle also includes an electrical energy storage device coupled to the electrical bus and having a status indicator mounted thereto. The status indicator is configured to provide a visual indication of a voltage of the electrical energy storage device.

According to another exemplary embodiment, method of producing an energy storage device for use with an electric vehicle includes providing an electrical energy storage device configured to be removably mounted to the electric vehicle and further configured to be coupled to an electrical system of the electric vehicle, and mounting a sensor to the electrical energy storage device. The method also includes configuring the sensor to measure a voltage of the electrical energy storage device and integrally mounting a status indicator to the electrical energy storage device. The method also includes configuring the status indicator to provide a visual indication of the voltage.

Other features and advantages of the present invention will become apparent from the following detailed description and accompanying drawings. It should be understood, however, that the detailed description and specific examples are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings, wherein like numerals depict like elements, and.

DETAILED DESCRIPTION

Before turning to the FIGURES which illustrate the exemplary embodiments in detail, it should be understood that the invention is not limited to the details or methodology set forth in the following description or illustrated in the FIGURES. The invention is capable of other embodiments or being practiced or carried out in various ways. It should also be understood that the phraseology and terminology employed herein is for the purpose of description only and should not be regarded as limiting.

In general, the energy storage device described herein comprises an electrical energy storage device having a status indicator configured to indicate the presence of electrical energy, such as the presence of a voltage differential associated with an electrical energy storage device configured for use with an electric traction vehicle. An electric traction vehicle is a vehicle that uses electricity in some form or another to provide all or part of the propulsion power of the vehicle. According to various embodiments, a sensor is coupled to the electrical energy storage device and configured to measure a voltage of the electrical energy storage device. A status indicator is also coupled to the electrical energy storage device and configured to provide a visual indication of the voltage of the electrical energy storage device. Providing a visual indication of the presence of electrical energy may decrease the likelihood of an electrical shock to operators or maintenance personnel. According to various other exemplary embodiments, the sensor and status indicator are integrally mounted to the electrical energy storage device. Providing the visual status indicator with the electrical energy storage device as a single integral unit provides a conveniently located indication of the presence of stored electrical energy for operators or maintenance personnel directly handling or working near the electrical energy storage device.

Figure 1:
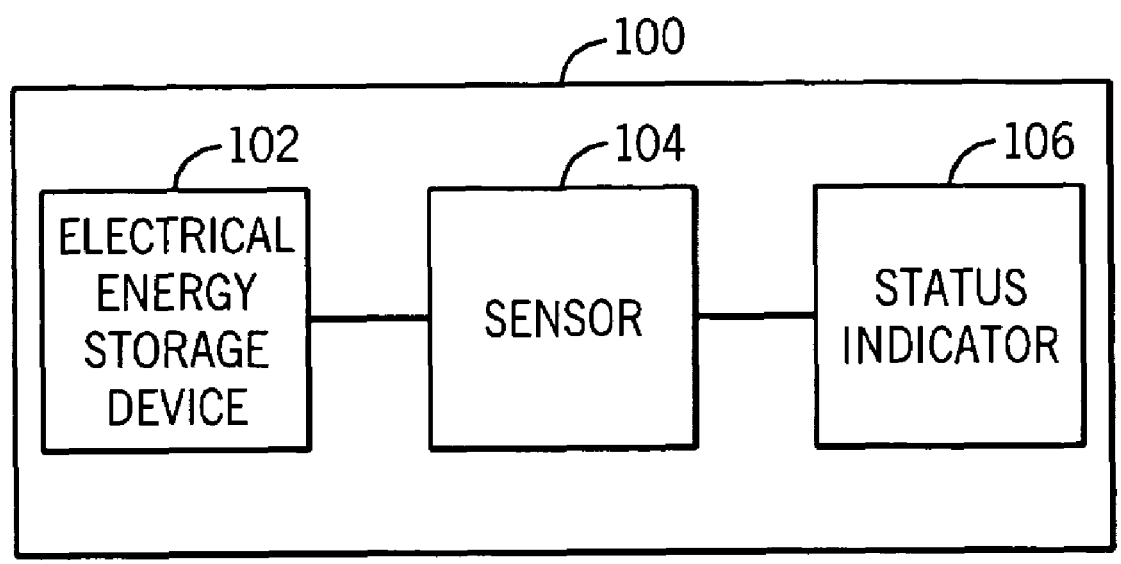
FIG. 1 schematically illustrates an energy storage device having a charge status indicator according to an exemplary embodiment.

FIG. 1 schematically illustrates an energy storage device 100 for use with an electric traction vehicle according to an exemplary embodiment. Energy storage device 100 includes an electrical energy storage device 102, a sensor 104, and a status indicator 106. Energy storage device 100 is generally configured to provide a visual indication of the presence of electrical energy, such as the presence of a voltage differential associated with electrical energy storage device 102.

Electrical energy storage device 102 is generally a rechargeable electrical device configured to store and release electrical energy, such as capacitor, a rechargeable battery, etc. Preferably, electrical energy storage device 102 is an electrochemical capacitor or "ultracapacitor," such as the PC 2500 ultracapacitor available from Maxwell Technologies, 9244 Balboa Avenue San Diego, Calif. 92123. These devices provide a high electrical energy storage and power capacity and have the ability to deliver bursts of high power and recharge rapidly from an electrical energy source/sink over hundreds of thousands of cycles. Electrical energy storage device 102 may also comprise a plurality of capacitors, ultracapacitors, or rechargeable batteries connected in series or parallel to form an ultracapacitor bank.

Electrical energy storage device 102 is also configured for use with an electric traction vehicle. For example, electrical energy storage device 102 may be configured to be coupled to the structure of an electric traction vehicle using brackets or other mounting assemblies and conventional fasteners (e.g., bolts, screws, etc.). For purposes of this disclosure, the term "coupled" means the joining of two members or devices directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. According to an exemplary embodiment, electrical energy storage device 102 is configured to be coupled to an electrical traction vehicle using a plurality of mounting holes or brackets integrally formed into the body of electrical energy storage device 102, such as mounting holes 210 shown in FIG. 2.

Electrical energy storage device 102 is also configured to be coupled to the electrical system of an electric traction vehicle. According to an exemplary embodiment, electrical energy storage device 102 includes a plurality of terminals or posts for coupling electrical energy storage device 102 to the electrical systems of the electric traction vehicle, such as positive terminal 212 and negative terminal 214 shown in FIG. 2.

Sensor 104 is coupled to electrical energy storage device 102. According to an exemplary embodiment, sensor 104 is coupled to the body of electrical energy storage device 102. For example, sensor 104 may be coupled to the body of electrical energy storage device 102 using suitable brackets, clamps, fasteners, adhesives, and the like. According to another exemplary embodiment, sensor 104 is mounted internal to or otherwise integrally formed or mounted within the body of electrical energy storage device 102.

Sensor 104 is configured to measure a voltage associated with electrical energy storage device 102, and to provide an output signal representative of the measured voltage. For example, according to an exemplary embodiment, sensor 104 is configured to measure the voltage across a positive terminal and negative terminal (e.g., terminals 212 and 214 shown in FIG. 2), the magnitude of which provides an indication of the amount of electrical energy stored in electrical energy storage device 102, and to provide an output representative of the measured voltage. Sensor 104 may be any of a number of analog or digital voltage sensing devices or circuits depending on the desired input voltage range and output functionality. For example, sensor 104 may be a device configured to measure an input voltage within a predetermined range and to provide a proportional output voltage or current, a binary output, a frequency output, etc. According to an exemplary embodiment, energy storage device 102 is an ultracapacitor with a maximum voltage rating of approximately sixty-four volts DC, and sensor 104 comprises an integrated circuit device having a DC-to-DC voltage converter configured to operate within an input range of approximately zero to eighty volts DC and to provide an output voltage of approximately five volts DC over an input voltage range of approximately four to eighty volts DC. Preferably, sensor 104 includes stabilizing capacitors, short circuit protection, reverse polarity protection, and thermal protection.

Status indicator 106 is coupled to the output of sensor 104. According to an exemplary embodiment, status indicator 106 is coupled to the body of electrical energy storage device 102. For example, status indicator 106 may be coupled to the body of electrical energy storage device 102 using suitable brackets, clamps, fasteners, adhesives, and the like. According to another exemplary embodiment, status indicator 106 is integrally formed or mounted within the body of electrical energy storage device 100 such that it remains visible. According to yet another exemplary embodiment, sensor 104 and status indicator 106 are constructed as a single piece (e.g., as components on a printed circuit board assembly) and are mounted internal to or otherwise integrally formed or mounted within the body of electrical energy storage device 102 such that status indicator 106 remains visible.

Status indicator 106 is configured to provide a visual indication of the voltage measured by sensor 104, and may be any of a number of suitable devices. For example, status indicator 106 may be an illuminated electronic device, such as a light-emitting diode (LED), a series of LEDs, a segmented LED display, a liquid crystal display (LCD), or the like. Status indicator 106 may also be an electromechanical dial or gauge, such as a linear or rotational needle gauge or the like.

Status indicator 106 may visually indicate the measured voltage in any number of suitable formats depending on the output configuration of sensor 104. For example, according to an exemplary embodiment, sensor 104 is configured to provide a binary output, such as an output of zero volts DC for a measured input voltage below a predetermined threshold and an output of five volts DC for a measured input voltage above the predetermined threshold, and status indicator 106 is an LED or other device configured to be illuminated when the input voltage is above the predetermined threshold. According to another exemplary embodiment, sensor 104 is configured to provide a binary output, such as a frequency of zero hertz for a measured input voltage below a predetermined threshold, and a predetermined non-zero frequency for a measured input voltage above the predetermined threshold, and status indicator 106 comprises an LED or other device configured to be intermittently illuminated at the predetermined frequency when the input voltage is above the predetermined threshold.

According to another exemplary embodiment, sensor 104 is configured to provide either several discrete output levels or a continuously proportional output depending upon the measured input voltage, and status indicator 106 is a device that includes a plurality of segments, such as individual LEDs, configured to be sequentially illuminated to indicate the measured input level. According to yet another exemplary embodiment, sensor 104 is configured to provide either several discrete output levels or a continuously proportional output depending upon the measured input voltage, and status indicator 106 is an alphanumeric display, such as an LED or LCD display, configured to display the measured voltage as alphanumeric text or other symbols. According to yet another exemplary embodiment, sensor 104 is configured to provide a continuously proportional output depending upon the measured input voltage, and status indicator 106 is a device such as an electromechanical dial or gauge having a linear or rotational needle gauge, that is configured to display the measured voltage.

Figure 2:
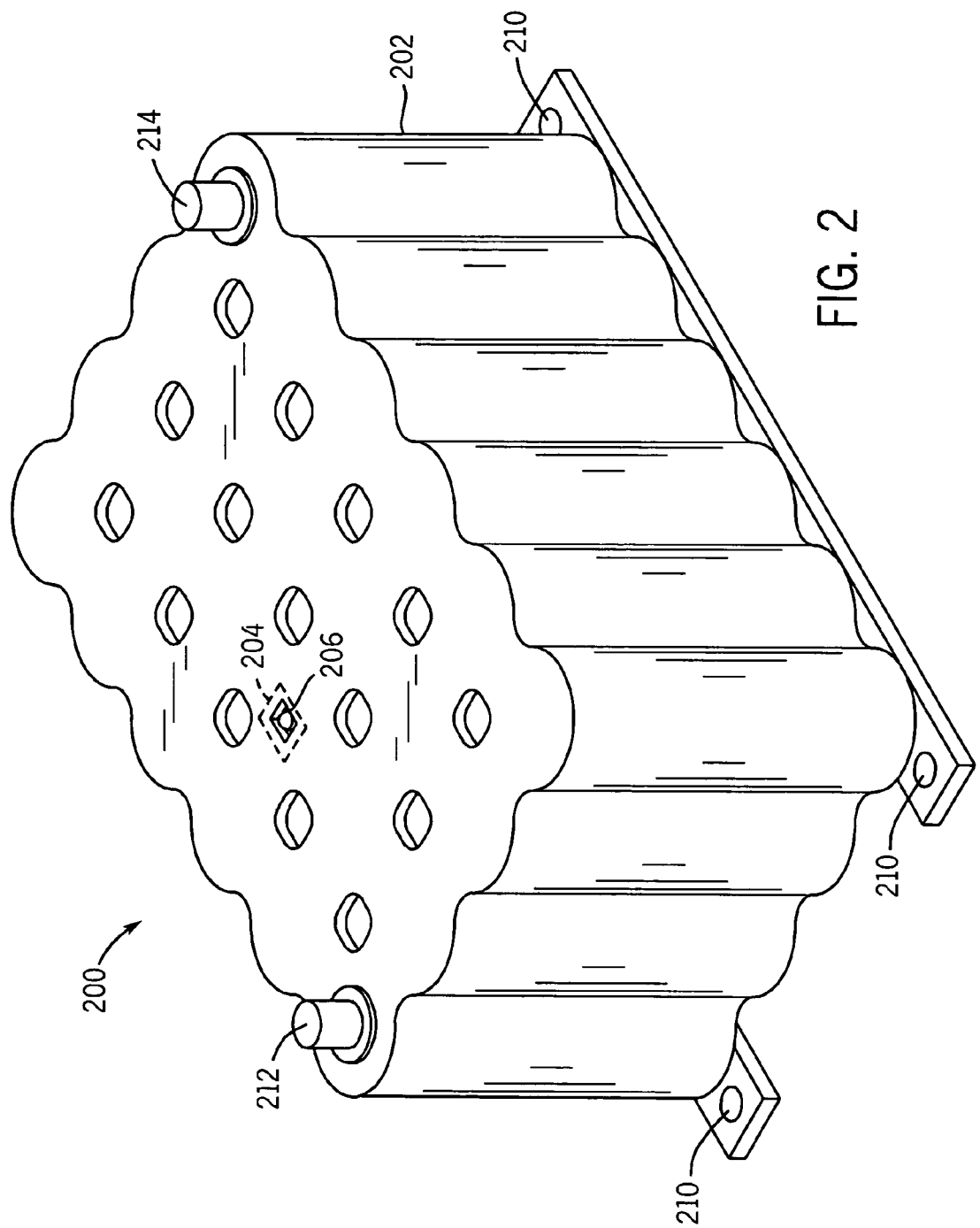
FIG. 2 illustrates a charge status indicator for an energy storage device for use with an electrical traction vehicle according to an exemplary embodiment.

FIG. 2 illustrates a charge status indicator 206 for an energy storage device 200 for use with an electrical traction vehicle according to an exemplary embodiment. Energy storage device 200 is an embodiment of energy storage device 100 and includes an electrical energy storage device 202, a sensor 204, and a status indicator 206. Electrical energy storage device 202 is configured to be coupled to an electrical traction vehicle using a plurality of mounting holes 210 integrally formed into the body of electrical energy storage device 202. Electrical energy storage device 202 is also configured to be coupled to the electrical system of an electric traction vehicle using positive terminal 212 and negative terminal 214. Sensor 204 and status indicator 206 are constructed as a single piece (e.g., as components on a printed circuit board assembly) and are integrally mounted within the body of electrical energy storage device 202 such that status indicator 206 remains visible.

Sensor 204 is configured to measure the voltage across positive terminal 212 and negative terminal 214, and to provide a binary output representative of the measured voltage. Status indicator 206 is an LED configured to provide a visual indication of the voltage measured by sensor 204. According to an exemplary embodiment, sensor 204 is configured to provide a binary output, such as an output of zero volts for a measured input voltage below a predetermined threshold and an output of five volts for a measured input voltage above the predetermined threshold, and status indicator 206 is configured to be illuminated when the input voltage is above the predetermined threshold. According to another exemplary embodiment, sensor 204 is configured to provide a binary output, such as a frequency of zero hertz for a measured input voltage below a predetermined threshold and a predetermined non-zero frequency for a measured input voltage above the predetermined threshold, and status indicator 206 is configured to be intermittently illuminated at the predetermined frequency when the input voltage is above the predetermined threshold.

Figure 3:
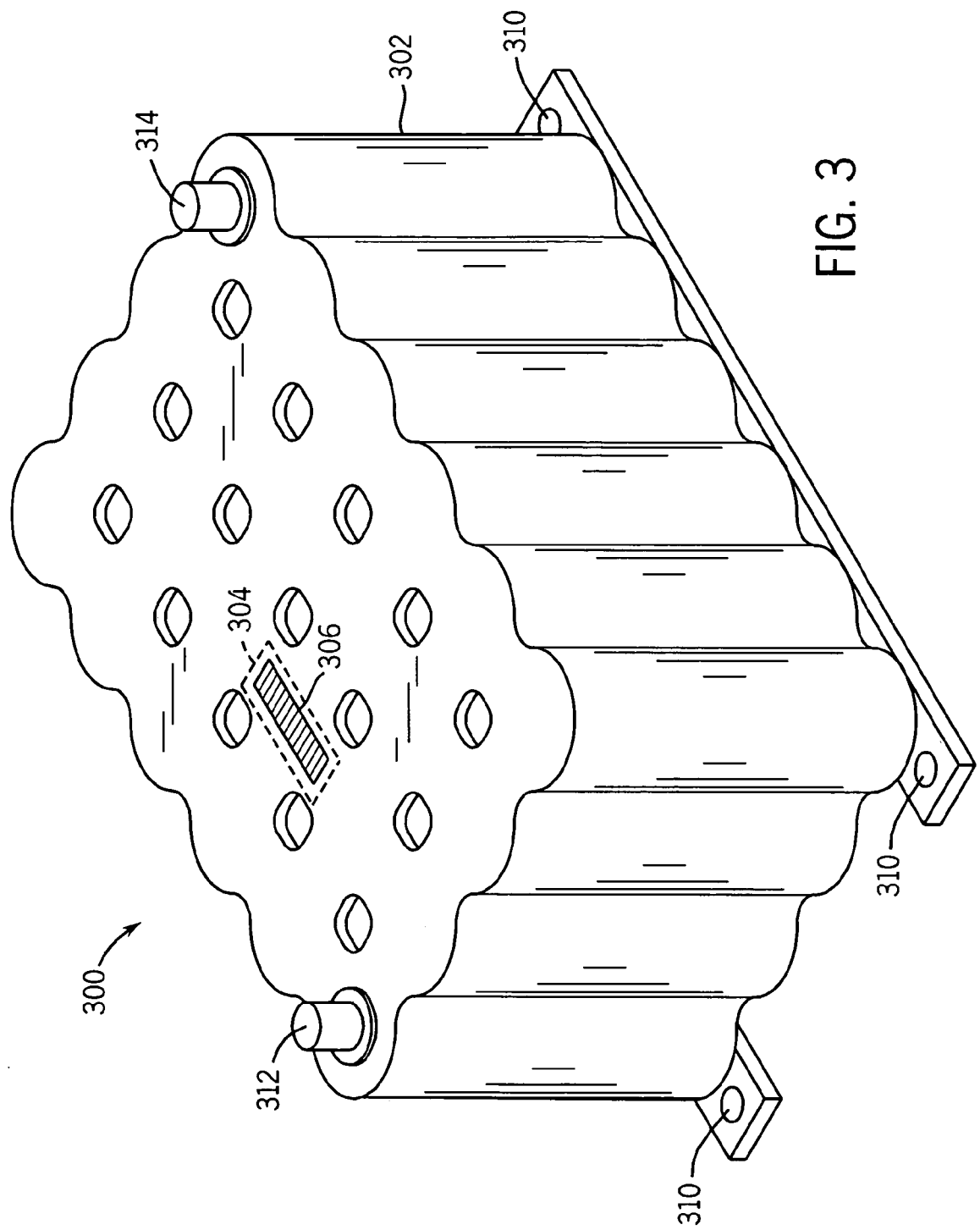
FIG. 3 illustrates a charge status indicator for an energy storage device for use with an electrical traction vehicle according to another exemplary embodiment.

FIG. 3 illustrates a charge status indicator 306 for an energy storage device 300 for use with an electrical traction vehicle according to another exemplary embodiment. Energy storage device 300 is an embodiment of energy storage device 100 and includes an electrical energy storage device 302, a sensor 304, and a status indicator 306. Electrical energy storage device 302 is configured to be coupled to an electrical traction vehicle using a plurality of mounting holes 310 integrally formed into the body of electrical energy storage device 302. Electrical energy storage device 302 is also configured to be coupled to the electrical system of an electric traction vehicle using positive terminal 312 and negative terminal 314. Sensor 304 and status indicator 306 are constructed as a single piece (e.g., as components on a printed circuit board assembly) and are integrally mounted within the body of electrical energy storage device 302 such that status indicator 306 remains visible.

Sensor 304 is configured to measure the voltage across positive terminal 312 and negative terminal 314, and to provide several discrete output levels (or alternatively a continuously proportional output signal) depending upon the measured input voltage. Status indicator 306 is a device that includes a plurality of individual LED segments configured to be sequentially illuminated to indicate the measured input voltage. According to various exemplary embodiments, differing colors, shapes, labels, etc. are used to further indicate particular voltage ranges of interest (e.g., red, amber, and green to indicate low, medium, and high voltage ranges).

Figure 4:
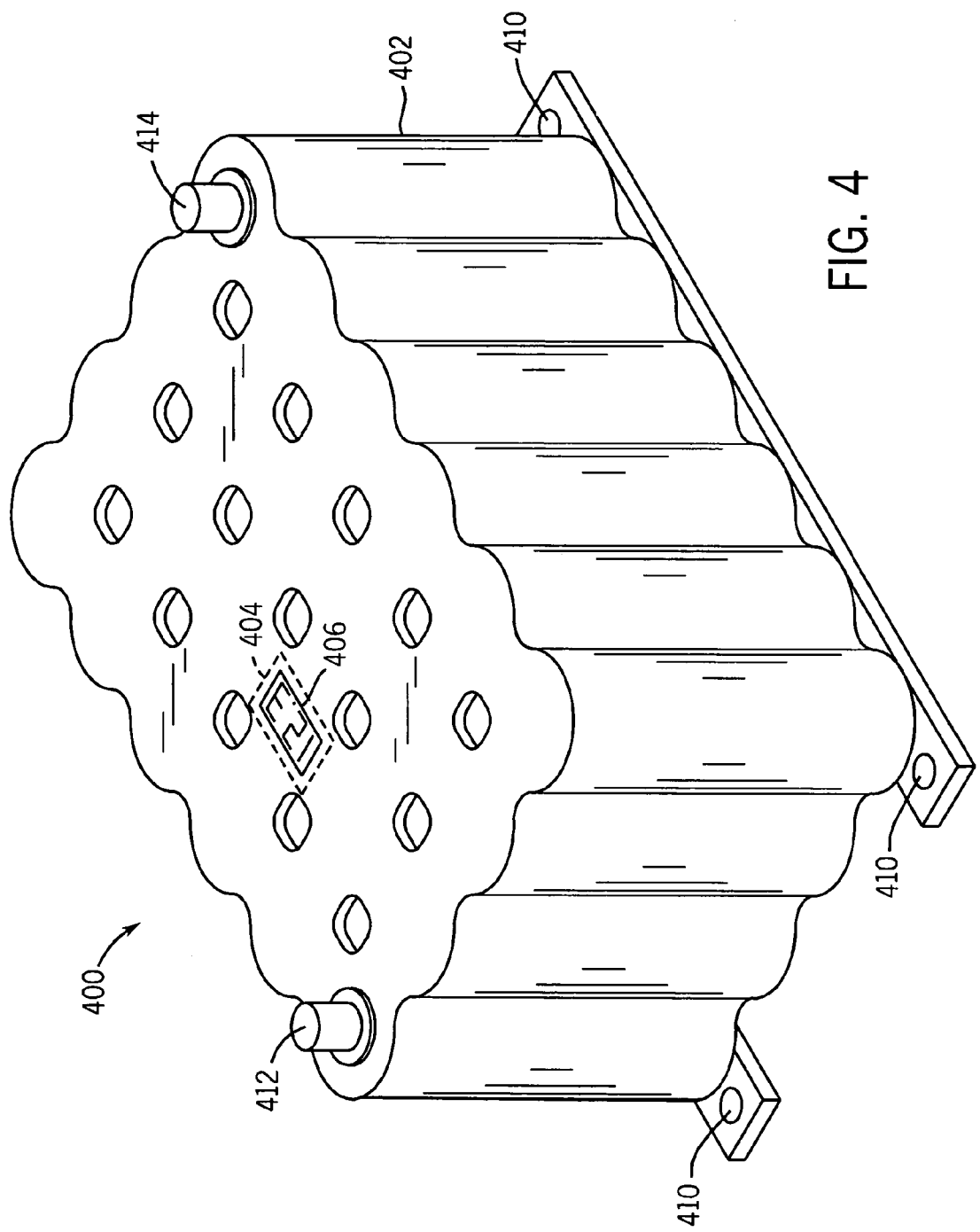
FIG. 4 illustrates a charge status indicator for an energy storage device for use with an electrical traction vehicle according to yet another exemplary embodiment.

FIG. 4 illustrates a charge status indicator 406 for an energy storage device 400 for use with an electrical traction vehicle according to yet another exemplary embodiment. Energy storage device 400 is an embodiment of energy storage device 100 and includes an electrical energy storage device 402, a sensor 404, and a status indicator 406. Electrical energy storage device 402 is configured to be coupled to an electric traction vehicle using a plurality of mounting holes 410 integrally formed into the body of electrical energy storage device 402. Electrical energy storage device 402 is also configured to be coupled to the electrical system of an electric traction vehicle using positive terminal 412 and negative terminal 414. Sensor 404 and status indicator 406 are constructed as a single piece (e.g., as components on a printed circuit board assembly) and are integrally mounted within the body of electrical energy storage device 402 such that status indicator 406 remains visible.

Sensor 404 is configured to measure the voltage across positive terminal 412 and negative terminal 414, and to provide several discrete output levels (or alternatively to provide a continuously proportional output) depending upon the measured input voltage. In the illustrated embodiment, status indicator 406 is a segmented LED display, and is configured to display the measured voltage as alphanumeric text or other symbols. According to another exemplary embodiment, status indicator 406 is an LCD display.

Figure 5:
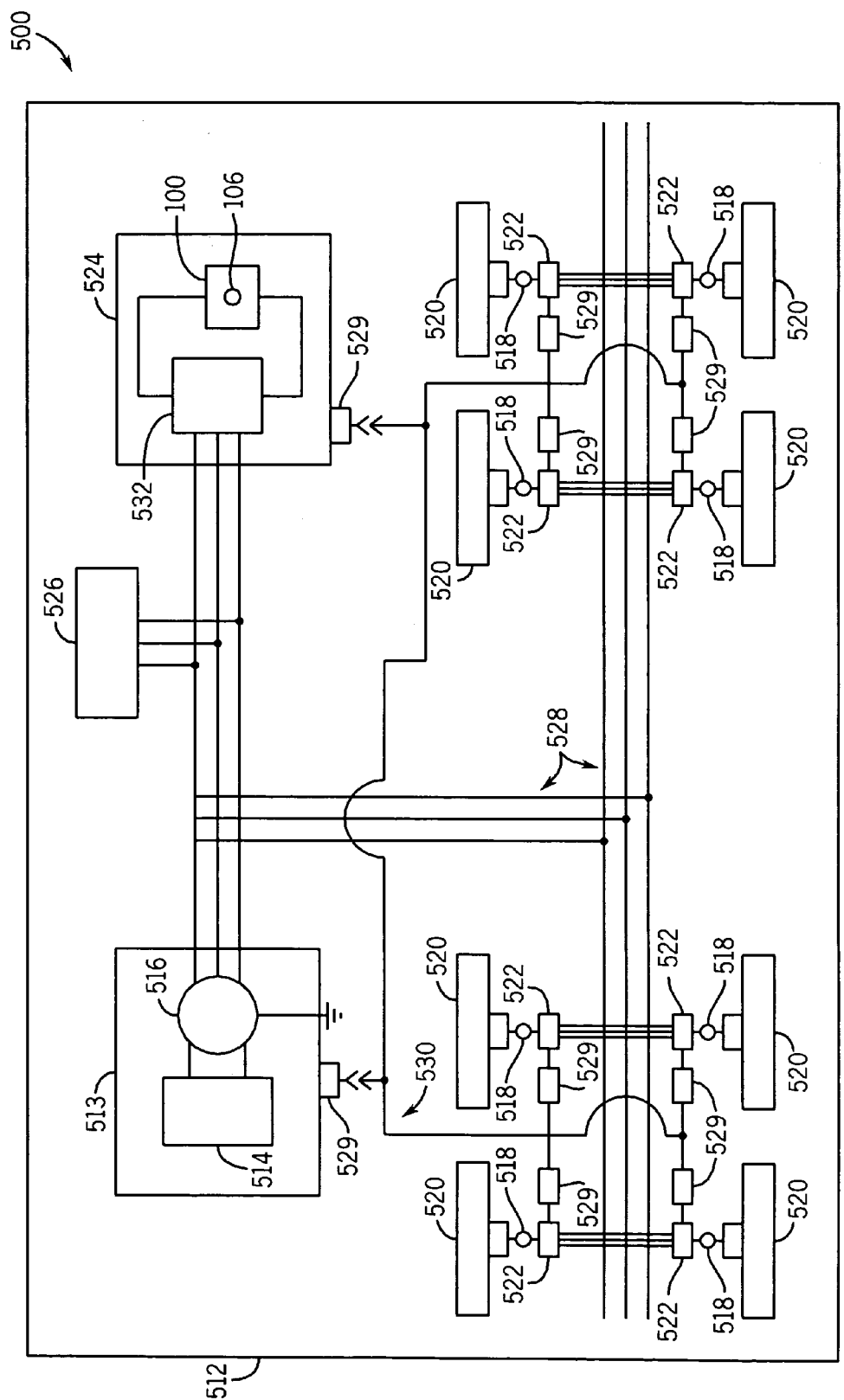
FIG. 5 schematically illustrates an electric traction vehicle including an electrical energy storage device having a charge status indicator according to an exemplary embodiment.

FIG. 5 schematically illustrates an electric traction vehicle 500 including energy storage device 100 according to an exemplary embodiment. An electric traction vehicle is a vehicle that uses electricity in some form or another to provide all or part of the propulsion power of the vehicle. A hybrid electric vehicle is an electric traction vehicle that uses more than one source of energy, such as energy storage device 100 another source, such as an internal combustion engine. Electric traction vehicle 500 may be used to implement electric traction vehicles in general and/or hybrid electric vehicles in particular. Electric traction vehicle 500 can implement a number of different vehicle types, such as a fire fighting vehicle, military vehicle, snow blower vehicle, refuse-handling vehicle, concrete mixing vehicle, etc.

In the illustrated embodiment, electric traction vehicle 500 includes a vehicle frame 512, a power source 513 including a prime mover 514 coupled to a generator or alternator 516, electric motors 518, drive wheels 520, servo or drive controllers 522, a power storage unit 524 including energy storage device 100, and an energy dissipation device 526. An electrical bus assembly 528, such as an AC electrical bus, provides an electrical power transmission link between generator or alternator 516, servo or drive controllers 522, power storage unit 524, and energy dissipation device 526. Electric vehicle 500 may further comprise a control system having a plurality of interface modules 529 interconnected by a communication network 530 through which electric vehicle 500 and its various functions are controlled and operated.

Power source 513 includes a prime mover or engine 514 coupled to a generator or alternator 516. Prime mover 514 is mounted relative to vehicle frame 512 and coupled to generator or alternator 516 in order provide rotational energy to drive generator or alternator 516. Prime mover 514 may be a gas turbine, an internal combustion engine, such as a diesel or gasoline engine, or the like. Preferably, prime mover 514 is a diesel engine optimized for operation at a constant speed (revolutions per minute). Operating the diesel engine at a constant, optimal speed eliminates inefficiencies associated with changing RPM levels during acceleration and deceleration, improves overall efficiency, and reduces emissions. Power source 513 may also be a fuel cell or a nuclear power device. The fuel cell may for example be a hydrogen-oxygen fuel cell that produces electrical power in the process of a chemical reaction that combines oxygen and hydrogen to create water.

Generator or alternator 516 is preferably a device such as a synchronous generator that supplies electric 460 to 480 volts, three-phase A/C 60 Hz power to each motor 518. According to various other embodiments, different sized generators or alternators may be coupled to the prime mover for purposes of generating either higher or lower amounts of electrical power. In yet other embodiments, a single phase system may be utilized, or a system that operates at a frequency other than 60 Hz, which is typical in European countries.

Electric motors 518 are appropriately sized traction motors. An exemplary embodiment of electric traction vehicle 500 employs an AC, three phase induction electric motor having a simple cast rotor, machine mount stator and sealed ball bearings. An induction motor is preferred because it avoids brushes, internal switches and sliding contact devices, with the rotor being the only moving part of the traction motor. Electric motors 518 may operate to produce electric torque to drive wheels 520 or may operate in a regenerative braking mode to provide power to power storage unit 524, as determined by inputs received from an operator of electric traction vehicle 500.

Drive wheels 520 are rotatably mounted relative to vehicle frame 512 with an electric motor 520 coupled to at least one wheel 520. According to an exemplary embodiment, drive wheels 520 are each coupled to respective electric motors 518, which in turn are each coupled to respective drive controllers 522, which are in turn coupled to electrical bus assembly 528 as well as the control system. According to various exemplary embodiments, electric traction vehicle 500 includes varying numbers of wheels 520 that are driven by an electric motor 518 (e.g., one, four, or eight driven wheels), and the ratio of motors, wheels, and servo drives need not be one-to-one relative to each other.

Power storage unit 524 includes an electric power converter 532 and energy storage device 100. Power storage unit 524 can be configured to provide electric power above and beyond that required of power source 513. Electric power converter 532 can be configured to convert the AC power generated by power source 513 to DC power and transfer such converted power to energy storage device 100. Electrical power converter 532 can also convert the energy stored in energy storage device 100 back to electrical bus assembly 528 to augment and supplement the AC power generated by principal power unit 513 over electrical bus assembly 528.

In operation, power storage unit 524 receives power from power source 513 over electrical bus assembly 528. The power received is converted into the appropriate energy mode required by energy storage device 100 and maintained in energy storage device 100 until required during the operation of electric traction vehicle 500. If power source 513 is not functioning for any reason, the energy in power storage unit 524 can be utilized to operate electric traction vehicle 500. In the context of a military vehicle, power storage unit 524 may also be used in stealth modes of operation to avoid the noise associated with prime mover (e.g., diesel engine) 514 and generator or alternator 516.

Energy storage recharge of power storage unit 524 by power source 513 begins automatically and immediately after electric traction vehicle 500 arrives at its destination and continues during the return of electric traction vehicle 500 to its original location. The state of charge of power storage unit 524 is maintained between missions by a simple plug connection to a power receptacle in the garage or storage location of electric traction vehicle 500, which receptacle will automatically disconnect as electric traction vehicle 500 leaves such site. Power storage unit 524 can also receive energy generated by electric motors 518 when motors 518 are configured in a regeneration mode in which case they function as a generator.

According to an exemplary embodiment, energy storage device 100 is constructed of capacitors or ultracapacitors, which are relatively easy to discharge. Therefore, it is possible to discharge energy storage device 100 when maintenance is to be performed on electric traction vehicle 500 to avoid electrocution of maintenance personnel. Status indicator 106 provides a visual indication of the amount of electrical energy stored in energy storage device 100 to maintenance personnel directly handling or working in the area of energy storage device 100. For example, a capacitor discharge switch may be provided in the cab of electrical traction vehicle 500 and/or near energy storage device 100. When the operator observes from status indicator 106 that a voltage is present, the operator may activate the switch to discharge the voltage. When the operator activates the switch, energy storage device 100 is the only power source coupled to electrical bus assembly 528. Therefore, any stored electrical power in energy storage device 100 dissipates through energy dissipation device 526. An example of an energy dissipation device 526 is a resistive coil that may be additionally cooled by fans or an appropriate fluid. The dissipating capacity (e.g., resistor size and power ratings) of energy dissipation device 526 may be determined as a function of the desired amount of discharge time. Other power consuming devices already coupled to electrical bus assembly 528, such as an engine cooling fan, may also be used.

The foregoing description of embodiments has been presented for purposes of illustration and description. It is not intended to be exhaustive or to be limited to the precise forms disclosed, and modifications and variations are possible in light of the above teachings or may be acquired from practice of the invention. For example, either the status indicator, the sensor, or both may be mounted to a location other than the electrical energy storage device, such as in the cab of an electric traction vehicle or near the electrical energy storage device. The energy storage device may also include an output port such that an additional status indicator, sensor, or both may be mounted to a location other than the electrical energy storage device, such as in the cab of an electric traction vehicle or near the electrical energy storage device. The status indicator and sensor may also be used in conjunction with other types of devices that provide a voltage differential, such as a generator or alternator. The embodiments were chosen and described in order to explain the principals of the invention and its practical application to enable one skilled in the art to utilize the invention in various embodiments and with various modifications as are suited to the particular use contemplated. It is intended that the scope of the invention be defined by the claims appended hereto and their equivalents.

What is claimed is:

1. An energy storage device for use with an electric vehicle, the energy storage device comprising:
    an electrical energy storage device including at least one ultracapacitor configured to be coupled to an electrical traction system of the electric vehicle to provide electrical power to the electrical traction system;
    a sensor integrally mounted within the electrical energy storage device and configured to measure a voltage of the ultracapacitor of the electrical energy storage device; and
    a status indicator integrally mounted to the electrical energy storage device and configured to provide a visual indication of the voltage.

2. The energy storage device of claim 1, wherein the electrical energy storage device includes positive and negative terminals configured to be coupled to the electrical traction system of the electric vehicle, and wherein the sensor is configured to measure the voltage across the positive and negative terminals.

3. The energy storage device of claim 1, wherein the status indicator comprises a light emitting diode.

4. The energy storage device of claim 3, wherein the electrical energy storage device is configured to intermittently illuminate the light emitting diode at a predetermined frequency when the voltage is greater than a predetermined threshold.

5. The energy storage device of claim 1, wherein the status indicator includes a plurality of segments configured to be sequentially illuminated to visually indicate the voltage.

6. The energy storage device of claim 1, wherein the status indicator comprises an alphanumeric display configured to visually indicate the voltage.

7. The energy storage device of claim 6, wherein the alphanumeric display is one of a light emitting diode display and a liquid crystal display.

8. The energy storage device of claim 1, wherein the sensor comprises a voltage converter.

9. A method of producing an energy storage device for use with an electric vehicle, the method comprising:
    providing an electrical energy storage device including at least one ultracapacitor configured to be removably mounted to the electric vehicle and further configured to be coupled to an electrical system of the electric vehicle;
    mounting a sensor to the electrical energy storage device configuring the sensor to measure a voltage of the ultracapacitor of the electrical energy storage device;
    integrally mounting a status indicator to the electrical energy storage device; and
    configuring the status indicator to provide a visual indication of the voltage.

10. The method of claim 9, wherein mounting the sensor to the electrical energy storage device comprises integrally mounting the sensor.

11. The method of claim 9, wherein configuring the sensor to measure the voltage comprises coupling the sensor to positive and negative terminals of the electrical energy storage device so that the sensor is configured to measure the voltage across the positive and negative terminals.

12. The method of claim 9, wherein the mounting the status indicator comprises mounting a light emitting diode.

13. The method of claim 12, further comprising configuring the electrical energy storage device to intermittently illuminate the light emitting diode at a predetermined frequency when the voltage is greater than a predetermined threshold.

14. The method of claim 9, wherein mounting the status indicator comprises mounting a plurality of segments configured to be sequentially illuminated.

15. The method of claim 9, wherein the mounting the status indicator comprises mounting an alphanumeric display.

16. The method of claim 9, wherein mounting the sensor includes mounting a voltage converter.

\* \* \* \* \*